July 2, 1968    J. R. DOYLE    3,390,422
SAUSAGE SKINNING MACHINE
Filed Aug. 11, 1966    6 Sheets-Sheet 1
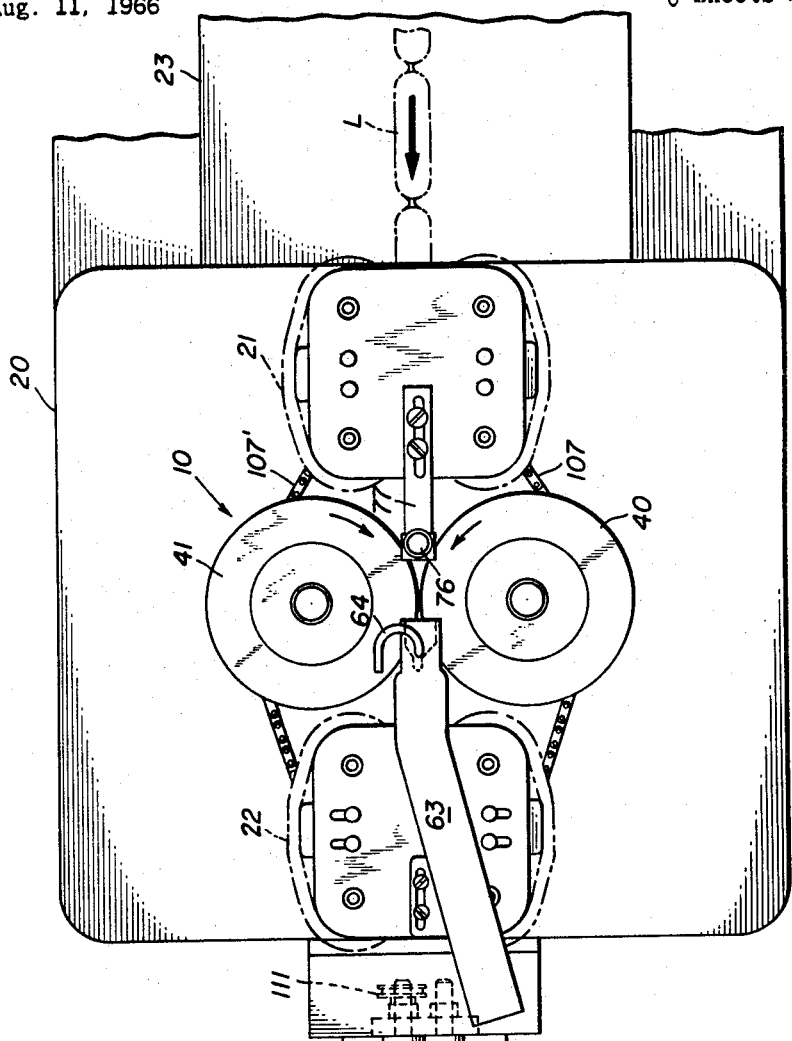
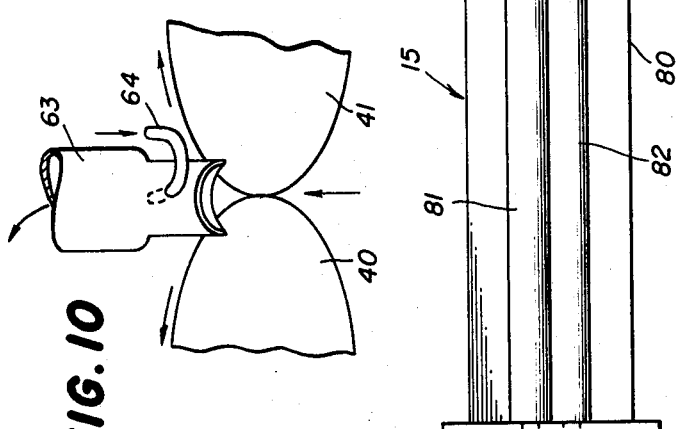
INVENTOR
JOHN R. DOYLE
BY
*Trist, Lockwood,*
*Trunawalt & Dewey* ATTYS.

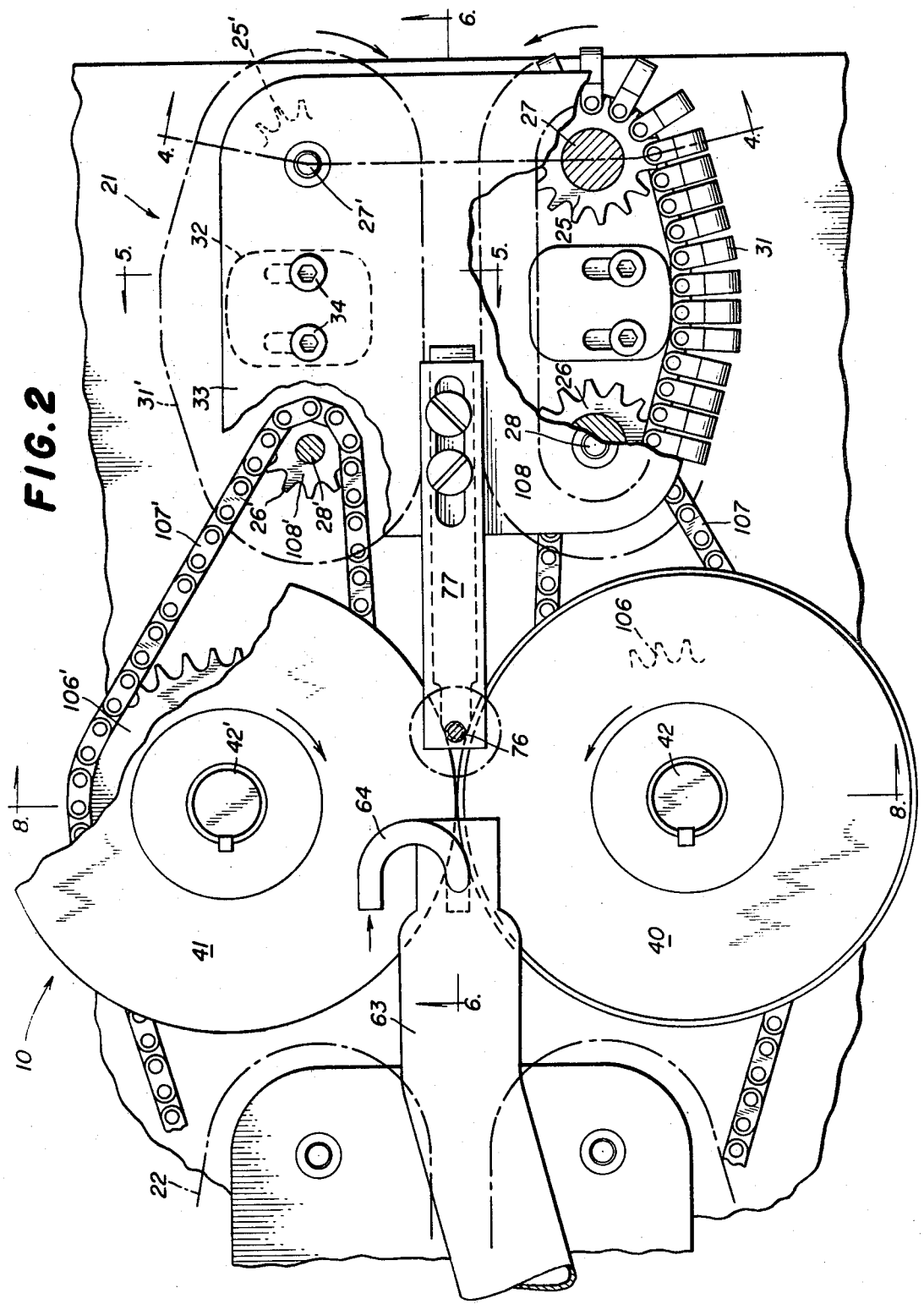

July 2, 1968  J. R. DOYLE  3,390,422
SAUSAGE SKINNING MACHINE

Filed Aug. 11, 1966  6 Sheets-Sheet 3

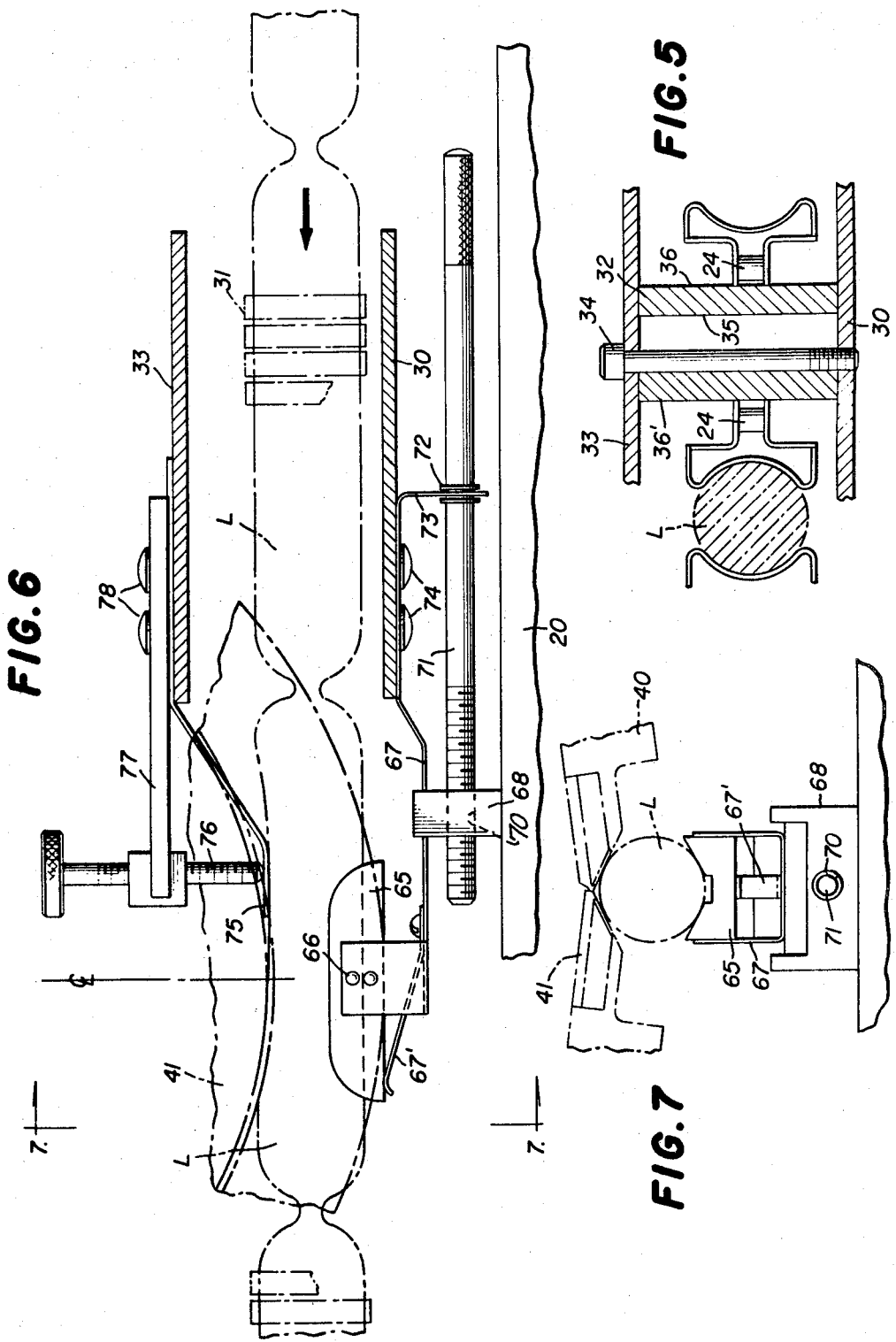

July 2, 1968  J. R. DOYLE  3,390,422

SAUSAGE SKINNING MACHINE

Filed Aug. 11, 1966  6 Sheets-Sheet 5

July 2, 1968   J. R. DOYLE   3,390,422
SAUSAGE SKINNING MACHINE
Filed Aug. 11, 1966   6 Sheets-Sheet 6
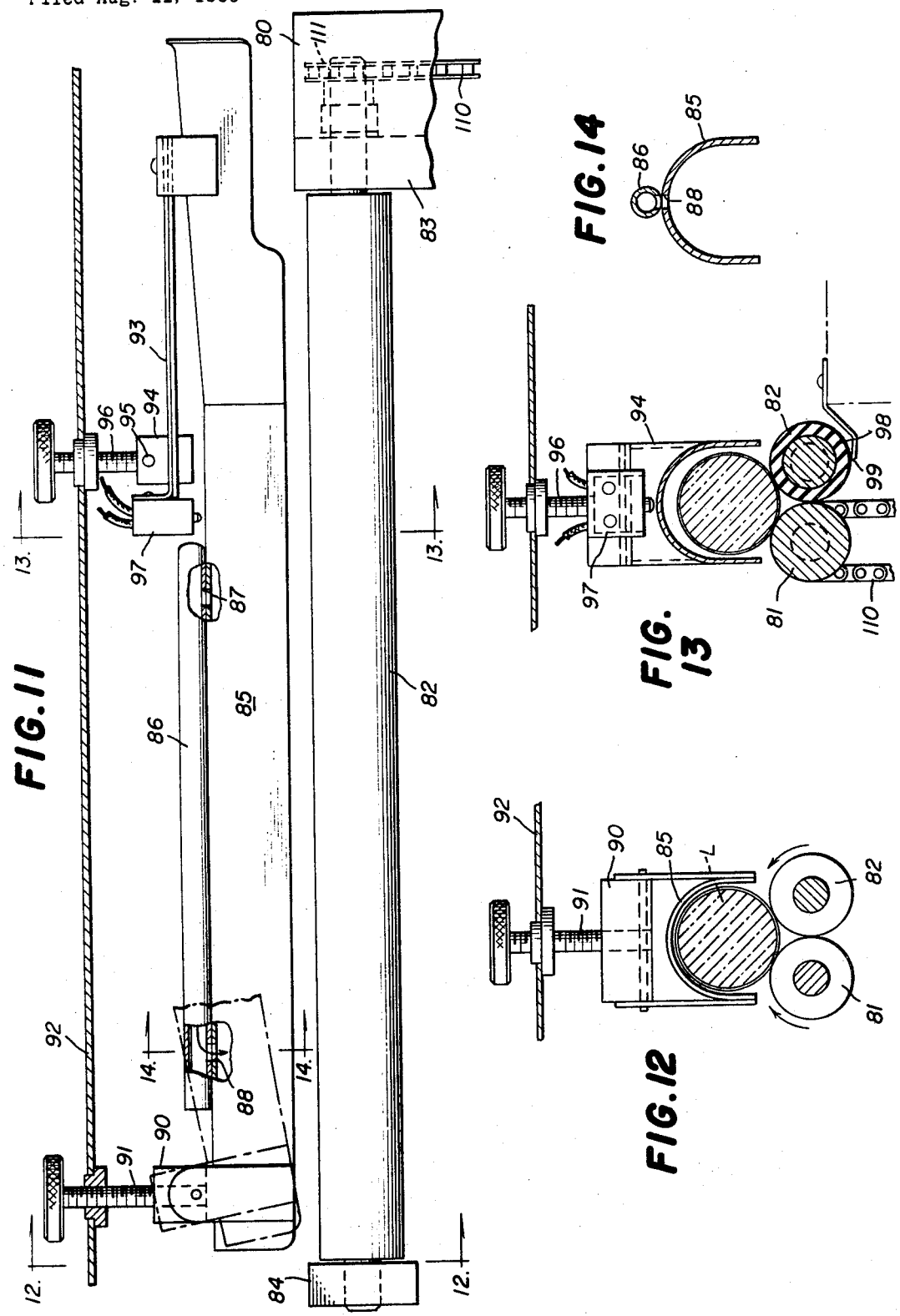

United States Patent Office 3,390,422
Patented July 2, 1968

3,390,422
SAUSAGE SKINNING MACHINE
John R. Doyle, Davenport, Iowa, assignor to The Kartridg Pak Co., Davenport, Iowa, a corporation of Iowa
Filed Aug. 11, 1966, Ser. No. 571,827
22 Claims. (Cl. 17—1)

ABSTRACT OF THE DISCLOSURE

An apparatus for removing the casings from strings of sausage links which is characterized by a gripper conveyor which feeds the encased sausages to a pair of squeeze rollers having co-operating groove edges between which the sausages are squeezed to form a continuous, longitudinal fin-like fold or bubble in the casing which is cut through by a co-operating knife and anvil member carried on the squeeze rollers, with the resultant casing sliver being removed through a vacuum waste line and with the sausages being advanced along a pair of parallel husking rolls which draw the slit casing between the same and strip it from the sausages.

---

This invention relates to the manufacture of sausages and like products and is more particularly concerned with improvements in mechanism for removing the casing or skin from a plurality of connected sausage links.

In the manufacture of sausages of various kinds, a predetermined length of suitable sausage casing, which may be formed, for example, from a cellulose film or similar material, is filled or stuffed with the sausage meat and divided into a plurality of individual sausages or links of substantially uniform length, generally by constricting a small section of the casing at suitable intervals. The length of connected links is then processed by cooking, smoking or other treatment necessary to prepare the product for marketing, after which the individual links are separated by removing the casing or skin. A number of machines have been developed for stripping or peeling the casing from the sausages. Generally these machines involve a casing slitting operation which requires passing the links longitudinally beneath a slitting knife with provision for initially separating the casing by inflating the same under air pressure so as to produce a space between the casing and the meat for the knife to enter and slit the casing. Machines of this type which have been successfully employed for skinning frankfurters and the like are disclosed in Wilcoxon Patent No. 2,424,346, granted July 22, 1947 and Grey Patents No. 2,686,927, granted Aug. 24, 1954 and No. 2,689,971, granted Sept. 28, 1954. While these machines and others of a similar character have been successfully employed in commercial operations, in some instances for long periods, it has been found that with some products and under certain conditions, these machines do not properly loosen and remove the casing from all the links. The efficiency of the machines is impaired, particularly when there are defects in the casing so that the air fails to perform its proper loosening function or when there is a degree of looseness in the casing which is greater than that for which the air pressure is set. A general object of the invention, therefore, is to provide a casing peeling mechanism which operates to efficiently slit the casing without damage to the sausage skin and without the need for the usual plough arrangement and air pressure for initially separating the casing from the sausages.

It is a more particular object of the invention to provide a sausage skinning machine which is adapted to remove, in an efficient manner, the casing from sausage products, where the casing is sufficiently loose on the product so that a portion of the casing may be forced outwardly of the peripheral surface of the sausage and into an axially extending fold or bubble for slitting or removal by a knife disposed along the path of travel of the same.

It is a further object of the invention to provide a machine for removing the casing from a plurality of serially connected links into which a stuffed casing has been divided which comprises means for advancing the links in a predetermined axial path, means for engaging portions of the peripheral surfaces of the links so as to form an axially extending fold in the casing which extends outwardly of the surface of each link with associated means for slitting the folded casing as the links advance and means for stripping the slit casing from the links.

It is a still further object of the invention to provide an apparatus for removing skin from sausages or similar products which comprise a pair of co-operating wheel members with their peripheral surfaces in opposed relation and having co-operating casing gripping and slitting elements associated therewith for causing a section of the casing to be formed into a fold or bubble lengthwise of the sausages which is cut away as the sausages advance adjacent the periphery of the wheel members and an associated mechanism for thereafter gripping the slit casing and stripping it from the sausages so as to free the same from the casing.

It is another object of the invention to provide a sausage skinning machine wherein the successive links are advanced beneath co-operating peripheral edges of a pair of rotatably mounted discs which pinch an axially extending portion of the casing between the peripheral edges so as to form a laterally extending, fin-like formation or bubble which is adapted to be cut loose by a knife forming edge on one of the discs operating against a co-operating anvil forming edge on the associated disc.

It is still another object of the invention to provide a mechanism for stripping the casing from a plurality of connected sausage links which mechanism includes means for advancing the links in an axial path to a pair of rotatably mounted wheel members which are disposed with their peripheral edges at the upper side of a passageway formed by adjustable guides through which the links are passed, and the wheel members having casing gripping elements which insure that a portion of the casing is pinched into a fold or bubble extending outwardly of the link surface as each link passes the wheel members and a knife edge operating in a plane generally tangential to the surface of the links for slitting the casing fold so as to provide an opening in the casing for removal of the links by an associated mechanism which strips the slit casing from the links.

These and other objects and advantages of the invention will be apparent from a consideration of the casing removing machine which is shown by way of illustration in the accompanying drawings wherein:

FIGURE 1 is a plan view with portions broken away and with other portions shown schematically of a machine for slitting the casing and removing the same from a connected string of sausages which incorporates therein the principal features of the invention;

FIGURE 2 is a plan view, to a larger scale, of a portion of the machine of FIGURE 1 with parts thereof broken away at the entrance end to the casing slitting mechanism;

FIGURE 5 is a fragmentary cross section taken on the line 5—5 of FIGURE 2, to a larger scale;

FIGURE 6 is a partial longitudinal section taken on the line 6—6 of FIGURE 2.

FIGURE 7 is a fragmentary section taken on the line 7—7 of FIGURE 6;

FIGURE 10 is a fragmentary perspective view showing a portion of FIGURE 1;

FIGURE 11 is a partial side elevation with portions broken away at the casing stripping end of the machine;

FIGURE 12 is a cross section taken on the line 12—12 of FIGURE 11;

FIGURE 13 is a cross section taken on the line 13—13 of FIGURE 11; and

FIGURE 14 is a cross section taken on the line 14—14 of FIGURE 11.

Figure 3:
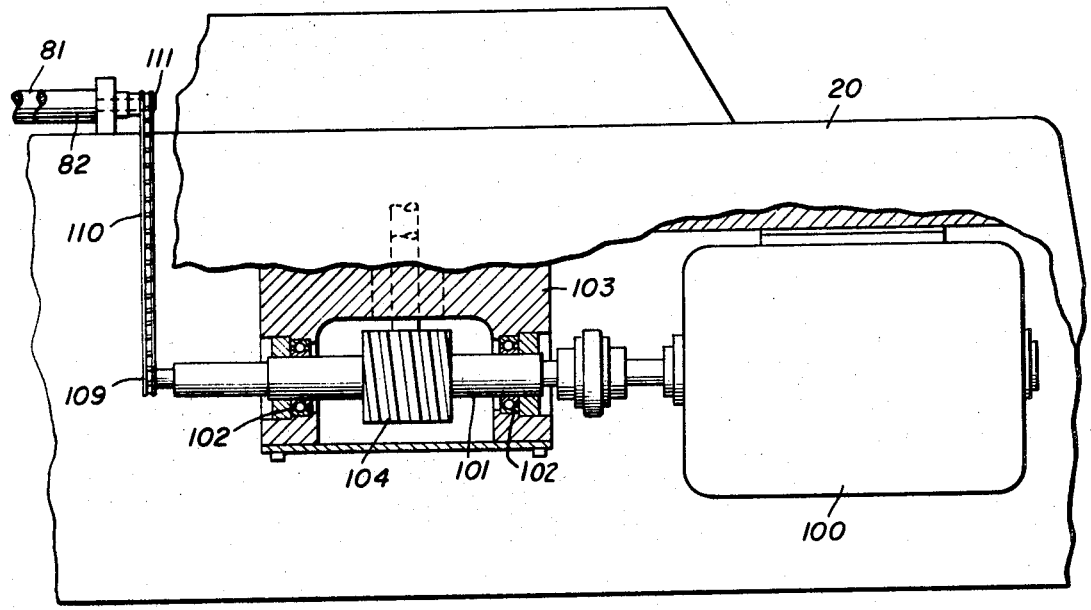
FIGURE 3 is a partial side elevation, to a smaller scale; and with portions broken away.
Figure 4:
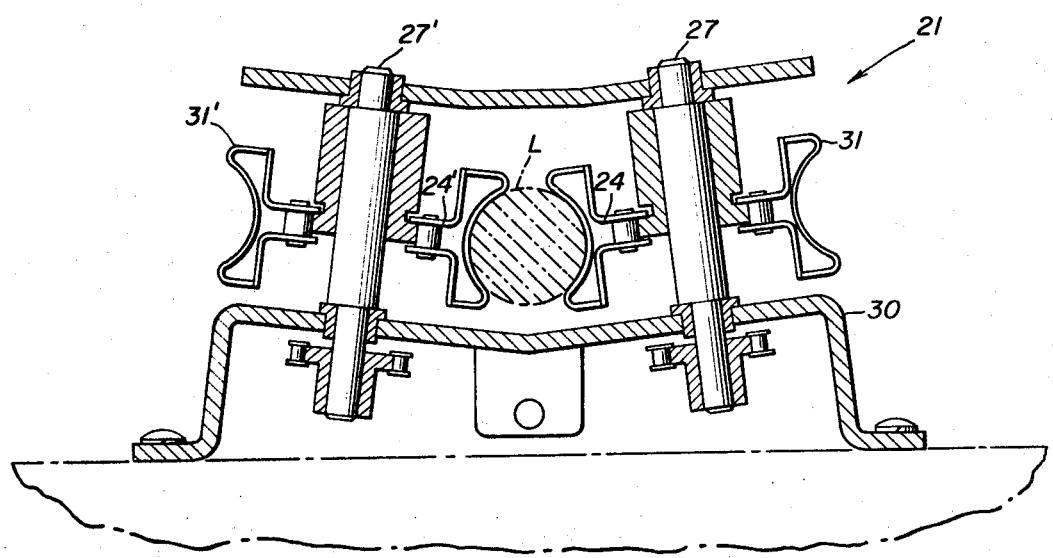
FIGURE 4 is a cross section taken on the line 4—4 of FIGURE 2.

Referring to the drawings, there is illustrated a mechanism which embodies the principal features of the invention and which is adapted to remove the casing from successive lengths or strings of connected sausage links. The sausages may be formed in a conventional manner by stuffing a casing of predetermined length and dividing the same into links of uniform length with each link separated from the adjacent links by a constricted section of the casing which may be tied, twisted or held in any other known manner during processing. The casing is of a character which is commercially referred to as "artificial" and which is formed of extruded cellulose or other suitable material and which is adapted to retain the product during the processing operations after which it is removed or stripped from the product and discarded.

The illustrated mechanism comprises a mechanism indicated at 10 for slitting a portion of the casing along the side of each successive link L in a string of sausages and an associated mechanism, indicated at 15, for separating the casing from the sausages so as to free the latter which are thereafter stored or packaged for subsequent marketing.

The casing slitting mechanism 10 and the associated stripping mechanism 15 are supported on an upright frame or base 20 together with link advancing conveyor mechanisms 21 and 22 which are associated with the casing slitting mechanism 10. The leading end of a water tray or steam chamber 23 may also be supported on the frame 20 at the entrance end of the conveyor mechanism 21 so as to permit the connected links to be immersed in water of suitable temperature or treated in a steam bath, before being fed to the machine so as to insure that the casing will be relaxed and will not have dried out to a degree which will cause it to stick to the skin of the sausages so as to interfere with the stripping operation. In using the apparatus, it is necessary that the casing be relatively free to move on the surface of the sausage.

The connected string of sausage links L is advanced to the casing slitting mechanism 10 by a conveyor mechanism 21 (FIGURES 1, 2, 4 and 5) and delivered to a like conveyor mechanism 22 which advances the links to the casing stripping mechanism 15 at the discharge end of the machine. The conveyor mechanism 21 which feeds the links to the casing slitting mechanism 10 comprises a pair of endless chains 24, 24′ supported on pairs of end sprockets 25, 26 and 25′, 26′ mounted on vertically disposed, spaced shafts 27, 28 and 27′, 28′ with the shafts of each pair thereof extending upwardly of a supporting bracket member 30 and inclined towards each other. Each of the chain 24 and 24′ carries a series of closely spaced link engaging plate-like gripper members 31 and 31′ which are adapted to move in oppositely disposed paths on opposite sides of the axial path traversed by the links and to co-operate with each other in gripping the links and advancing them to the slitting mechanism 10. Each of the chains 24 and 24′ is adapted to be tensioned by a laterally adjustable guide block 32 (FIGURES 2 and 5) clamped between the bottom support bracket 30 and a support top plate 33 by a pair of clamp bolts 34 extending through elongate slots 35 in the block 32. Guideway forming vertical surfaces 36 and 36′ on the oppositely disposed edge faces of the block 32 are engaged by opposite runs of the chain 24 so as to hold the link gripping plates 31 in properly adjusted position for advancing the links between the opposed runs of the two chains 24 and 24′.

Figure 9:
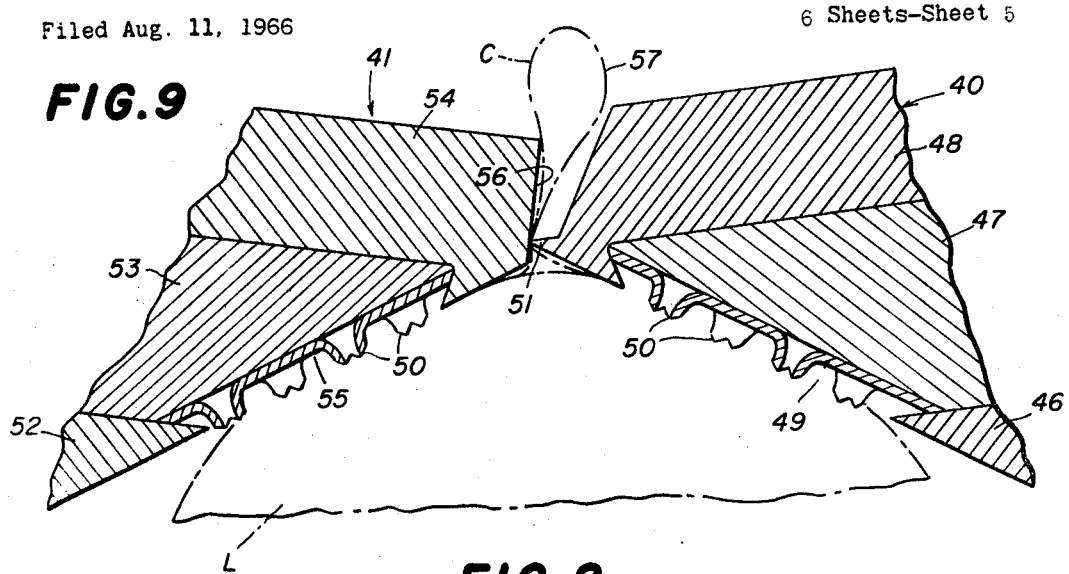
FIGURE 9 is a fragmentary view showing a portion of the mechanism in FIGURE 8, to a larger scale.
Figure 8:
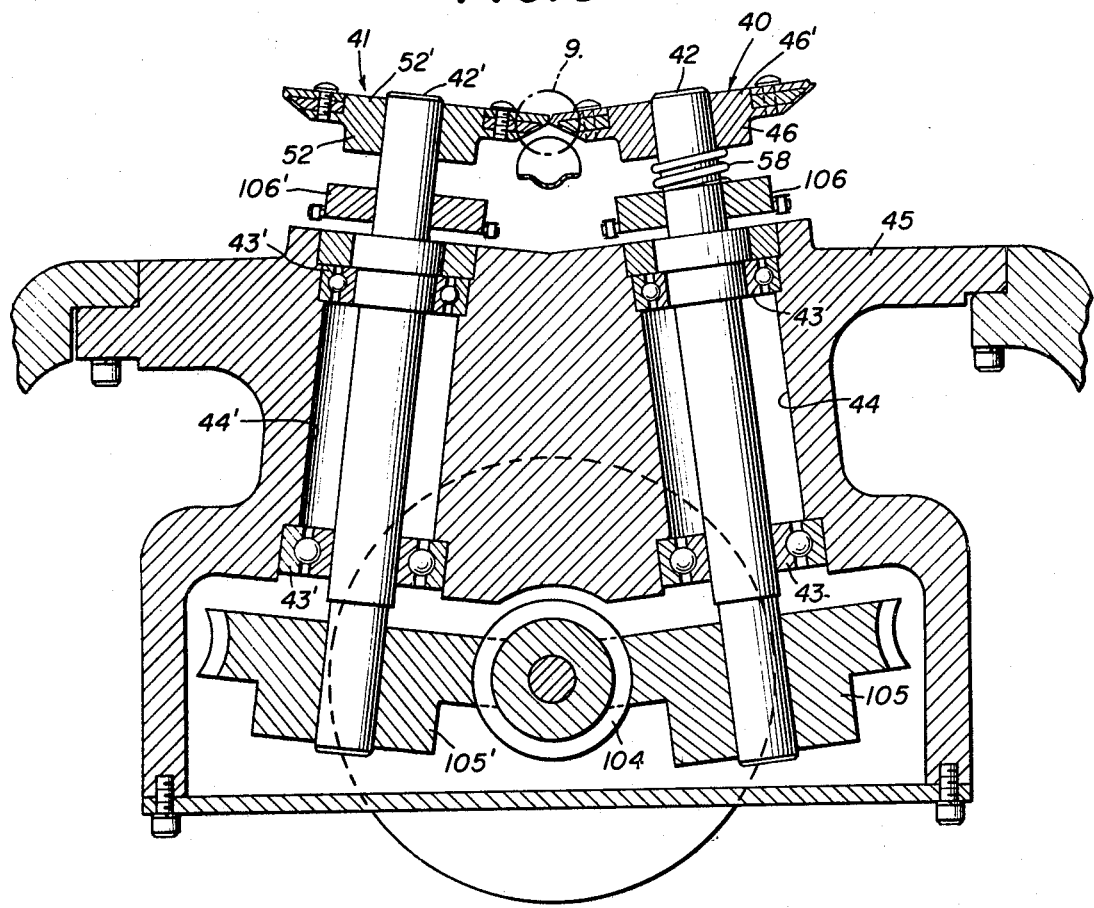
FIGURE 8 is a cross section taken on the line 8—8 of FIGURE 2, to a smaller scale.

The casing slitting mechanism 10 comprises a pair of wheel-like disc members 40 and 41 (FIGURES 1, 2, 8 and 9) which are mounted on the upper ends of a pair of upwardly extending shafts 42 and 42′ which shafts are journaled at their lower ends in pairs of axially spaced bearings 43 and 43′ mounted in upwardly inclined bores 44 and 44′ in a supporting base member 45. Each of the wheel members 40 (FIGURES 8 and 9) comprises a base or body member 46 splined on its support shaft 42 and having a hub section 46′ for receiving a friction ring support plate member 47 and a knife carrying plate 48 which are bolted or otherwise secured on the base forming member 46. The ring support plate carries on its peripheral edge a friction member 49 which is preferably formed by punching a plurality of closely spaced holes in a thin strip of stainless steel so as to leave jagged projections 50 on the surface which is disposed on the outer sausage engaging surface. The plate member 48 has a knife edge 51 formed on the peripheral edge. The wheel member 41 has a body member 52 with a hub portion 52′ which receives a friction ring support plate 53 and an anvil forming plate 54. A friction member 55 is carried on the edge of the plate 53 which is of the same character as friction member 49 and the plate member 54 has an edge surface 56 for co-operation with the knife edge 51 so as to form a cutting tool for slitting a portion of the casing C which is folded or pinched so as to form a fold or bubble 57 which will protrude between the cutting edge 51 and the anvil 56 as the link advances and the casing is gripped by the pad forming friction members 49 and 55 and forced into a fin-like fold or bubble formation 57. The fold 57 is cut or slit between the cutting knife edge 51 and the anvil 56 resulting in a sliver of waste as indicated in FIGURE 9. The anvil wheel 41 is adjustable axially of its supporting shaft 42′. The knife wheel 40 is urged upwardly by compression spring 58 and the point or line where the knife edge 51 engages the anvil surface 56 may be adjusted to cut the bubble 57 at the proper distance from the sausage. The bubble sliver or waste may be conveniently removed from the machine through a waste discharge tube 63 mounted with its receiving end above the zone of operation of the cutting edge 51 and having an air tube 64 for creating suction in tube 63 to draw the sliver into the same.

The links L are guided between the slitting wheels 40 and 41 by guide mechanism shown in FIGURE 6 which is adjustable to urge the links upwardly into engagement with the friction members 49 and 55. The guide mechanism includes a lower support guide member 65 pivoted at 66 on upstanding ears adjacent the end of an elongate bracket 67 which extends forwardly of the bottom support plate 30. The guide bracket 67 is of spring material and has an upwardy bent spring plate 67′ at the forward end engaging beneath the leading end of the guide shoe 65. The bracket 67 is supported intermediate its length on the top of lug member 68 which is upstanding from the base frame 20. The lug 68 has a threaded bore 70 which receives the threaded end of a position adjusting pin 71. The pin 71 has a grommet 72 forming a rotatable connection with a downwardly bent flange 73 on the trailing end of the bracket 67 so that rotation of the pin 71 moves the guide shoes 65 along the axial path of the links L, the bracket 67 having a set screw and slot connection at 74 with the base plate 30 so as to permit adjustment thereof relative to the slitting wheels 40 and 41.

A spring holddown plate 75 is mounted on the top support plate 33 and a pressure applying screw 76 is mounted in the leading end of a supporting bracket plate 77 with its lower end engaging with the bent end of the holddown plate 75 so as to hold the same against the top of the links L. The bracket plate 77 and the holddown plate 75 are adjustably mounted on the top plate 33 by a set screw and slot connection 78 in the same manner as the mounting for the bracket plate 67 on the lower bracket member 30 so that the holddown plate 75 may be adjusted the proper distance from the bight of the wheel members 40 and 41 and at the proper height for pinching the casing C so as to form the bubble 57 without damage to the sausages.

The links are advanced from the slitting device 10 by the gripping conveyor 22 to the casing removing or husking apparatus 15 (FIGURES 1, 11, 12 and 13) which is supported on a frame forming bracket 80 attached to the main support frame 20 and extending in the direction of advancing movement of the links L. The husking device 15 comprises a pair of elongate rollers 81 and 82 journaled in upstanding end supports 83 and 84 with their axes in parallel relation and their peripheries in contact. The roller 81 is preferably metal and the roller 82 is rubber covered, with the two rollers being driven as indicated at the arrows in FIGURE 12 so as to feed the slit casing down between the same for discharge from the machine. An elongate housing forming shell 85 of generally U-shaped cross section is mounted above the rollers 81 and 82 with its open side facing downwardly and a compressed air manifold 86 is mounted on the top thereof which opens into the compartment formed by the housing at 87 and 88. The air tube 86 is connected to a suitable source of compressed air and is operated to blow the slit casing from the links as they are advanced or pushed by oncoming links along the axis of the rolls 81 and 82 above the same as shown in FIGURES 12 and 13. The shield or housing 85 is supported at its forward end on a pivot block 90 mounted at the lower end of a vertically adjustable pin 91 depending from cover forming member 92. At its other end the housing or shield 85 is secured to one end of a small spring plate 93 which has a pin and slot connection at its other end to a bracket 94 pivoted at 95 on the lower end of a vertically adjustable pin 96. A microswitch 97 is mounted on the bracket 94 so that upon predetermined upward movement of the shield 85 due to a jam-up of the links beneath the shield 85, the microswitch 97 will be operated to stop the machine. A blade-like member 98 is mounted beneath rubber roll 82 with the edge 99 slightly spaced from the surface of roll 82 so as to prevent the casing from wrapping around the roll 82 and insuring that it will be fed down between the rolls 81 and 82 to suitable waste receptacle (not shown).

The mechanism may be operated by a motor 100 (FIGURE 3) which may be mounted in the main frame 20 and coupled to a drive shaft 101 supported in a pair of journal bearings 102 in a depending bracket support 103 beneath the casing slitting mechanism 10. The drive shaft 101 carries a helical gear 104 which engages with a pair of gears 105 and 105' on the lower ends of the wheel carrying shafts 42 and 42'. Each of the shafts 42 and 42' carries at its upper end a sprocket 106 and 106'. The sprockets 106 and 106' drive endless chains 107 and 107' which engage with sprockets 108 and 108' on the shafts 28 and 28' so as to drive the conveyor chains 24 and 24' of the link advancing mechanism 21. The chains 107 and 107' have a like driving connection for operating the link advancing conveyor chains in the mechanism 22 at the leading side of the slitting mechanism 10. The drive shaft 101 carries at its forward end the sprocket 109 which is connected by drive chain 110 with a sprocket 111 on the end of the shaft or husking roll 81. The roll 82 is frictionally driven by engagement with the driven roll 81.

In operating the mechanism, the sausage links L (FIGURE 1) are fed to the skinning mechanism 10 by the conveyor mechanism 21 and guided to the two wheel-like discs 40 and 41 through the restricted passageway formed by the pressure shoe 65 and holddown spring 75, the latter being adjusted for the proper size of the product being handled with adjustment of pin 71 to position the shoe 65 at the proper location relative to the bight of the wheels 40 and 41. The casing C is pinched at the top of the links so that a folded fin-like portion or bubble 57 is projected between the knife edges 60 and 61 (FIGURES 8 and 9) on the wheel discs 40 and 41 and a resultant sliver is cut away to provide an opening in the casing for removal therefrom of the sausage links. The opening may be of varying size, the width depending upon the looseness of the casing and the length upon the condition of the same between the links. The knife edge 51 and anvil 56 are operative to cut the fold portion 57 of the casing outboard of the surface of the sausage, operating in a plane approximately tangential to the sausage surface. As the links advance beyond the mechanism 10 the conveyor 22 moves the same ahead to the husking mechanism 15 where the links are pushed along the top of the husking rolls 81 and 82 by pressure of oncoming links. The leading end of the slit casing is threaded down between the husking rolls 81 and 82 with the air blown in through the manifold openings 87 and 88 assisting in stripping the casing from the sausage surface and directing it between the husking rollers 81 and 82. The sausages, when freed from the casing through the opening or openings cut therein, are pushed along the husking rolls 81 and 82 and discharged from the machine. If there is any jam-up beneath the air shield 85 it will pivot the shield and operate the switch 97 to stop the machine so that the jam-up may be cleared.

The mechanism is adapted to separate or remove the casing from sausages formed or linked in any manner when the casing has sufficient looseness to permit the same to be pinched by the wheel discs 40 and 41 and form the fold necessary for accomplishing the casing slitting operation.

While particular materials and specific details of construction have been referred to in describing the form of the mechanism illustrated, it will be understood that other materials and equivalent structural details may be resorted to within the spirit of the invention.

I claim:

1. A machine for removing the casing from a plurality of serially connected links into which a stuffed casing has been divided, comprising means for advancing the links in a predetermined axial path, means engaging the peripheral surfaces of the links as they advance so as to form a fin-like fold in a portion of the link casing which extends in an axial direction and outwardly of the surface of each successive link, means for cutting the folded casing portions as the links advance in said path so as to open the casing for removal of the links, and means for stripping the casing from the links.

2. A machine as recited in claim 1, and said casing fold forming means comprising oppositely disposed traveling members having opposed faces which engage peripherally spaced portions of the casing and draw the same toward each other.

3. A machine as recited in claim 1, and said casing fold forming means comprising wheel-like members disposed adjacent the path of advance of the links and having oppositely disposed surfaces against which the links are forced as they advance and means on said wheel-like members for engaging spaced portions of the casing and moving said portions thereof into fold forming relation.

4. A mechanism for removing the casing from a plurality of connected links into which a stuffed casing has been divided, which mechanism includes means for advancing the links along an axial path, means in said path forming a restricted passageway having a cross sectional area corresponding approximately to the cross sectional area of the stuffed casing and constructed so that upon passage of a link through said passageway a portion of the casing is formed into a longitudinally extending fin-like fold which projects laterally of the surface of the link, and means operative to slit the folded portion of the casing so as to open the casing and permit the associated link to be removed therefrom by stripping away the casing.

5. A mechanism as recited in claim 4, and said means for forming said passageway comprising a pair of guide members mounted on opposite sides of said axial path and co-operating, peripherally spaced means for engaging spaced portions of the casing and forcing the same toward each other so as to form the fold therein.

6. A mechanism as recited in claim 4, and said casing slitting means operating in a plane which is generally tangential to the surface of said links.

7. A mechanism for stripping the casing from a plurality of connected links into which a stuffed casing has been divided, said mechanism including means for advancing the links in an axial path, a pair of rotatably mounted wheel members positioned with their peripheral surfaces in oppositely disposed relation, co-operating guide members adjacent said surfaces which form a passageway through which the links are advanced and which guide the links into engagement with portions of the peripheral surfaces of said wheel members so that portions of the casing which are engaged thereby are urged toward each other and the casing is pinched to form a fold extending outwardly of the link surface as it advances, and means for slitting the fold portion thus formed so as to provide an opening for removal of the link from the casing.

8. A mechanism as recited in claim 7, and said means for slitting the fold portion of the casing comprising a knife edge traveling in a plane which is generally tangential to the surface of the links.

9. A mechanism as recited in claim 7, and said means for slitting the fold portion of the casing comprising a knife edge on the wheel members which is operative in a plane extending outboard of the surface of the links.

10. A mechanism for stripping the casing from a plurality of connected links into which a stuffed casing has been divided, said mechanism including means for advancing the links in a linear path, a pair of rotatably mounted wheel-like disc members having peripheral surfaces in oppositely disposed relation to each other and guide members which cooperate to form a passageway through which successive links pass, said passageway forming guide members and said peripheral surfaces being arranged so that a portion of the casing is pinched together into a fold projecting outwardly of the link surface as each link passes through said passageway, and means for cutting off the pinched portion of the casing so as to provide an opening in the casing for removal of the link from the casing.

11. A mechanism as recited in claim 10, and said means for cutting off the pinched portion of the casing comprising a rotating knife edge traveling in a plane through which the pinched portion of the casing projects.

12. A mechanism as recited in claim 10, and said means for cutting off the pinched portion of the casing comprising a knife edge on the one disc member which is operative in a plane extending at one side of the passageway and approximately tangent to the link surface.

13. A mechanism as recited in claim 10, and one of said disc members having a knife edge on its peripheral surface, an anvil forming portion on the peripheral surface of the other disc member for co-operation with said knife edge and means to adjust the point of engagement between said knife edge and said anvil portion.

14. A mechanism recited in claim 10, and said disc members being mounted on axes which are inclined toward each other so that the discs operate in planes which are in angular relation to each other, with one of the discs having an anvil portion on its peripheral surface traveling in a plane which is inclined relative to the axis of the disc and the other disc having a co-operating cutting edge on its peripheral surface constituting said means for cutting off the pinched portion of the casing.

15. A mechanism as recited in claim 10, and said disc members being mounted for rotation on upstanding shafts which are inclined toward each other and having portions of the peripheral surfaces in downwardly diverging relation with gripping means thereon which engage the casing and pinch the same to form said fold.

16. A mechanism as recited in claim 10, and said link guide members being mounted for adjustment relative to the path of the peripheral surfaces on said disc members so as to engage each successive link with portions of the peripheral surfaces of said disc members as the link advances through said passageway.

17. A mechanism as recited in claim 16, and said link guide members comprising a top holddown member adjustably mounted adjacent contacting portions of the disc members and a bottom support member adjustably mounted in spaced relation below said contacting portions.

18. A mechanism as recited in claim 1 and the means for stripping the casing comprising a pair of elongate rollers mounted on parallel axes extending in the direction of advance of the links which co-operate to pull the casing between their surfaces in a direction laterally of the path of the links.

19. A mechanism as recited in claim 18, and a housing supported above said elongate rollers having a connection with a compressed air source for directing air under pressure into the opening in the casing as the links are advanced along the axis of said elongate rollers so as to strip the casing from the links.

20. A mechanism as recited in claim 18, and said housing being pivotally mounted at its leading end so that it will be swung upwardly relative to said elongate rollers upon a jam-up resulting from an accumulation of links beneath the housing and means operative upon such upward movement of the housing to stop the machine.

21. A method of removing the casing from a casing stuffed sausage link which comprises engaging the peripheral surface of the link so as to pinch the casing and form a fin-like fold therein which extends in an axial direction and outwardly of the surface of the link, severing the folded portion of the casing so as to provide an opening in the casing and separating the casing from the link.

22. A method of removing the casing from a plurality of serially connected links into which a stuffed casing has been divided, comprising advancing the links in a predetermined axial path, engaging the peripheral surfaces of the links so as to force a portion of the casing into a fin-like fold which extends in an axial direction and outwardly of the surface of the links, slitting the folded casing portion so as to open the casing and separating the slit casing from the links.

References Cited

UNITED STATES PATENTS

| | | | |
|---|---|---|---|
| 2,340,755 | 2/1944 | Jacobson | 17—1 |
| 2,434,316 | 1/1948 | Golden et al. | 17—1 |
| 2,463,157 | 3/1949 | Deitrickson | 17—1 |
| 3,276,352 | 10/1966 | Allen et al. | 17—1 |

LUCIE H. LAUDENSLAGER, *Primary Examiner.*